J. N. McGRIFF.
LAWN MOWER BLADE.
APPLICATION FILED NOV. 18, 1913.
1,109,776.
Patented Sept. 8, 1914.
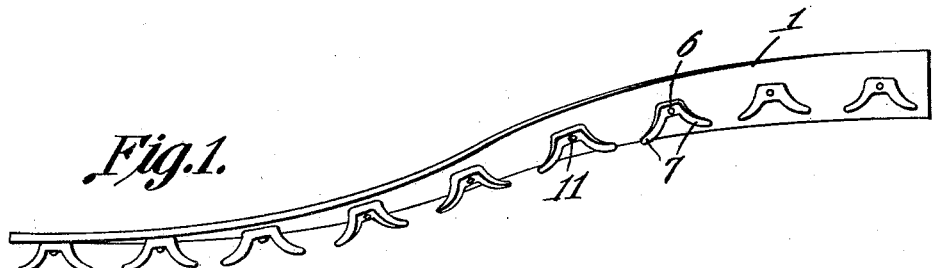
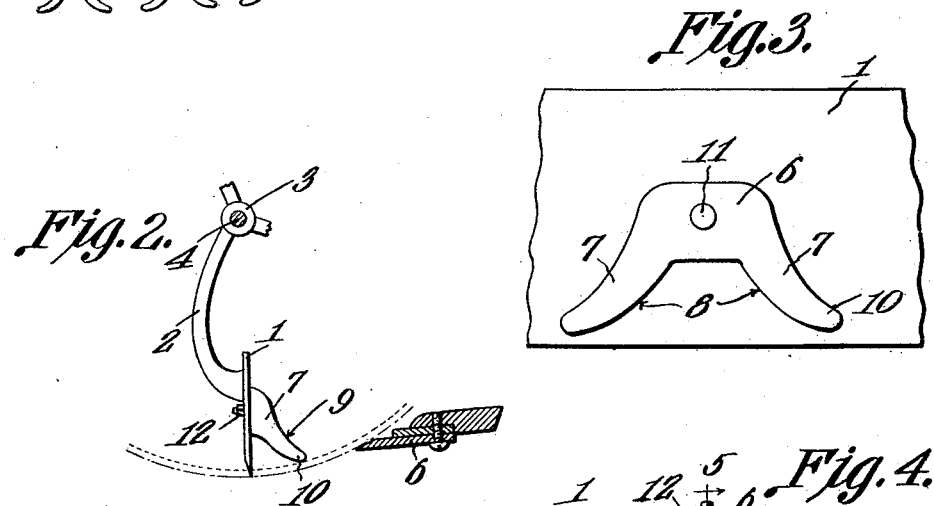
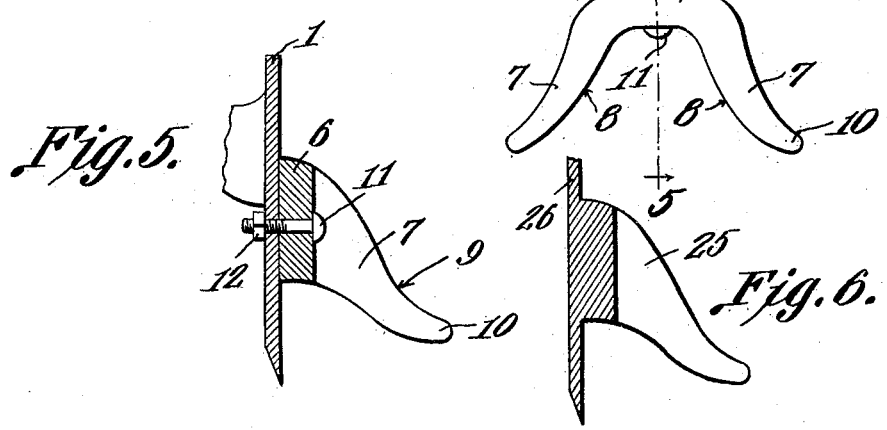
John N. McGriff,
Inventor
Witnesses
by C. A. Snow & Co.
Attorneys

UNITED STATES PATENT OFFICE.

JOHN N. McGRIFF, OF ANDERSON, INDIANA.

LAWN-MOWER BLADE.

1,109,776.  Specification of Letters Patent.  Patented Sept. 8, 1914.

Application filed November 18, 1913. Serial No. 801,660.

*To all whom it may concern:*

Be it known that I, JOHN N. MCGRIFF, a citizen of the United States, residing at Anderson, in the county of Madison and State of Indiana, have invented a new and useful Lawn-Mower Blade, of which the following is a specification.

The device forming the subject matter of this application is a mower blade of novel construction, and, more specifically, the invention aims to provide a novel form of grass-lifting bracket adapted to be applied to a mower blade.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows in perspective, a mower blade equipped with a plurality of the brackets constituting the subject matter of this application; Fig. 2 is an end elevation of a mower blade embodying the invention; Fig. 3 is a fragmental front elevation of a mower blade to which the invention has been applied; Fig. 4 is a top plan of the structure shown in Fig. 3; Fig. 5 is a cross section on the line 5—5 of Fig. 4; Fig. 6 is a sectional detail showing a slightly modified form of the invention.

In the accompanying drawings there is shown a blade 1 of the sort commonly used upon a lawn mower, the blade ordinarily being of a sinuous form as shown in Fig. 1. A plurality of the blades 1 are generally provided, the same being secured by means of spokes 2 to a hub 3 receiving a driving shaft 4, the blades coöperating with a cutter bar 5, all of which is common and well understood in the art.

In carrying out the present invention there is provided a grass-lifting bracket, the same in the present instance being shown as comprising a back plate 6 and projecting prongs 7. As indicated at 8, the prongs diverge from each other, and as shown at 9, they slant downwardly toward the cutting edge of the blade 1. This downward slant of the prongs 7, indicated at 9, may be described by the statement that the prongs 7 are inclined with respect to the back plate 3, at an angle to the direction of divergence of the prongs, meaning thereby that when the blade 1 stands vertically as shown in Fig. 5, the prongs 7 diverge in a horizontal direction, as at 8, and slant vertically, as shown at 9. As indicated at 10, the prongs 7 preferably taper toward their free ends.

A plurality of the grass-lifting brackets hereinbefore described are secured to each blade 1. Any suitable means may be provided for attaching the brackets to the blade. As shown, the parts above mentioned are connected by a bolt 11, passing through the back plate 6, and by a nut 12 which is mounted upon the bolt.

When the blade 1 revolves with the axis of the shaft 4 as a center, the extremities of the prongs 7 move in a circumference which lies slightly inside of the active edge of the cutter bar 5. As will be understood readily, the function of the prongs 7 is to lift grass which is bent over, inclined or trodden down, the result being that the grass is lifted, so that the same will coöperate properly with the cutter bar 5 and with the blade 1.

When a lawn mower is equipped with the grass-lifting brackets shown in this application, a clean cut of a lawn may be secured by passing over the lawn once with the mower, it being unnecessary to make repeated trips with the mower, in order to cause the lawn to assume a presentable and evenly cut appearance.

In Fig. 6, the bracket 25 is of the form hereinbefore described, the only difference being that the bracket is formed integrally with the blade 26.

Having thus described the invention, what is claimed is:—

1. The combination with a mower blade mounted for rotation, and a cutter bar, of a grass lifting bracket located upon that face of the blade which is presented toward the cutter bar when the blade is coacting with the cutter bar, the bracket being movable with the blade transversely of the cutter bar and independently of the cutter bar.

2. In a device of the class described, a mower blade mounted for rotation and provided with diverging, grass lifting prongs inclined with respect to the blade toward the free edge of the blade at an angle to the direction of divergence of the prongs.

3. In a device of the class described, a mower blade mounted for rotation and a grass lifter secured to the blade, the lifter comprising diverging prongs, the prongs being inclined with respect to the blade toward the cutting edge of the blade, at an angle to the direction of divergence of the prongs, the lifter including a base plate connecting the prongs; and means for connecting the base plate with the blade.

In testimony that I claim the foregoing as my own, I have hereto affixed my signature in the presence of two witnesses.

JOHN N. McGRIFF.

Witnesses:
 WILLSIS M. MILLER,
 IRA D. LAMBERT.

Copies of this patent may be obtained for five cents each, by addressing the "Commissioner of Patents, Washington, D. C."